A. L. MESSIER.
FRICTION CLUTCH.
APPLICATION FILED APR. 25, 1910.

968,676.

Patented Aug. 30, 1910.

Witnesses:
Robert N. McCue
Arthur Carlson

Inventor:
Auguste L. Messier
his Attys

UNITED STATES PATENT OFFICE.

AUGUSTE L. MESSIER, OF CHICAGO, ILLINOIS, ASSIGNOR TO H. W. CALDWELL & SON COMPANY, OF CHICAGO, ILLINOIS, A CORPORATION OF ILLINOIS.

FRICTION-CLUTCH.

968,676.

Specification of Letters Patent.

Patented Aug. 30, 1910.

Application filed April 25, 1910. Serial No. 557,461.

*To all whom it may concern:*

Be it known that I, AUGUSTE L. MESSIER, a citizen of the United States, residing at Chicago, in the county of Cook and State of Illinois, have invented certain new and useful Improvements in Friction-Clutches, of which the following is a specification.

The invention relates to improvements in ring clutches and the object is to provide a simple and durable construction wherein the clutch may be opened as well as closed by positive action and adjustments readily made to take up wear.

Figure 1:
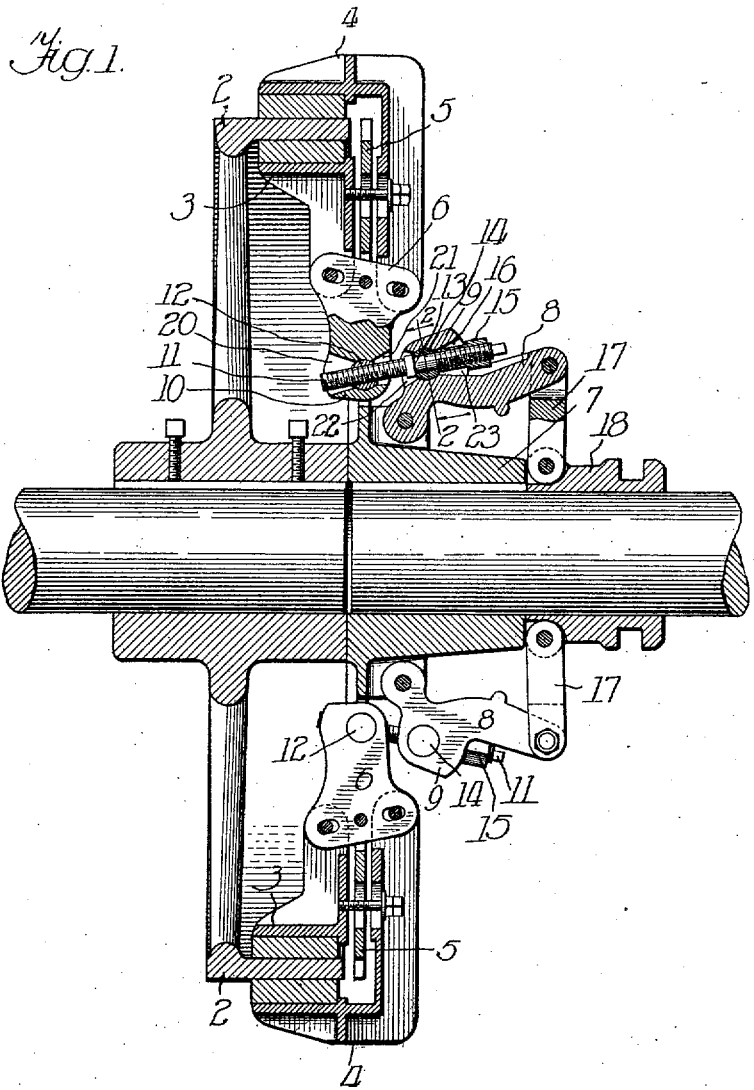
Figure 2:
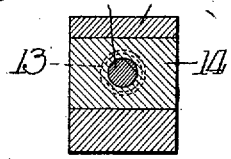

In the drawings which accompany and form part of this specification Figure 1 represents in diametrical section a clutch embodying the present invention; and Fig. 2 is a detail sectional view taken on the line 2—2 of Fig. 1.

The driving ring is designated by the numeral 2, inside clutch jaws by the numeral 3 and outside jaws by the numeral 4, said jaws being arranged to slide upon the spider 5. Fulcrum levers 6 are pivoted to said spider and project on opposite sides of the same, being connected to the jaws by slot-and-pin construction and adapted by rocking movement to open and close the jaws.

To the hub 7 of the spider 5 there are pivoted levers 8 by which to operate the fulcrum levers 6 through adjustable connections. Thus said levers 8 have outwardly-projecting portions 9 overlapping the inwardly-extending portions 10 of said levers 6, and screws 11 connect the overlapping portions of the levers. As shown in the upper half of Fig. 1 the threaded portion of the screw 11 at one end engages a cylindrical block or swivel piece 12 journaled in a correspondingly formed cross-bore in the inner portion 10 of the lever 6. A shoulder 13 on the screw 11 bears against a flattened portion of a similar cylindrical block or swivel piece 14 loosely engaging a corresponding cross-bore in the outwardly-projecting portion 9 of the lever 8. An unthreaded portion of the screw passes through said cylindrical block 14, but beyond this smooth or unthreaded portion the screw is threaded in its smaller diameter to receive a lock nut 15 formed with a tubular extension or sleeve 16 adapted to engage a flattened portion of the cylindrical block 14.

It will be obvious that the above-described construction provides a positive connection between the lever 8 and the lever 6 for opening as well as closing the clutch. The levers 8 are connected by links 17 with the usual sliding collar 18. It will be seen that outward movement of the levers 8 occasioned by inward thrust of the collar to a position such as shown in Fig. 1, will cause the cylindrical blocks 14 to act against the shoulders 13 of the screws 11 and that the latter will rock the levers 6 and force the clutch jaws into engagement with the ring 2. It will likewise be apparent that movement of the collar in the opposite direction, causing inward movement of the levers 8, will result in the cylindrical blocks 14 acting against the lock sleeves 16 and thereby rocking the levers 6 through the medium of the screws 11.

The loose mounting or journaling of the blocks 12 and 14 in their respective levers provides for the necessary rocking to accommodate relative movements of the levers, and relative movement of the screws 11 and levers is accommodated by openings extending through the latter and made flaring on opposite sides of the cylindrical blocks. Thus the inwardly-extending portion 10 of each lever 6 has flaring openings 20 and 21 and the outwardly-extending portion 9 of each lever 8 has flaring openings 22 and 23, the latter being extended into the main portion of the lever 8 to accommodate the nut 15.

It will be noted that the above-described construction provides a thoroughly reliable form of friction clutch with positive action both in opening and closing. The arrangement of the fulcrum levers and their operating levers with portions overlapping in close proximity and near the hub of the spider provides for a short and direct operating connection between the levers and one not likely to be affected by centrifugal action. This arrangement also has the advantage of providing an extremely compact construction. It will be noted that the arrangement for adjustment is extremely simple. Turning back the lock nut 15 will permit turning of the screw itself to effect any desired adjustment of the jaws. The lock nut serves both for maintaining the adjustment and as part of the positive connection for opening the jaws.

What I claim is:

1. In a friction ring clutch, the combination of drive ring, inside and outside jaws, spider, fulcrum levers mounted thereon and connected to the jaws and having inwardly-projecting portions, thrust collar, levers linked to the latter and extending adjacent the inwardly-projecting portions of the fulcrum levers, and adjustable longitudinally-extending couplings positively connecting said linked levers and said inwardly-projecting portions of the fulcrum levers for movement together in both directions, said couplings having adjusting and locking means located at the outer sides of the levers and there protruding for manipulation.

2. In a friction ring clutch, the combination of drive ring, inside and outside jaws, spider, fulcrum levers mounted thereon and connected to the jaws and having inwardly-projecting portions, thrust collar, levers linked to the latter and having outwardly-projecting portions overlapping the inwardly-projecting portions of the fulcrum levers, swivel nuts in the latter, and screws engaging said nuts to turn therein and having thrust engagement with the outwardly-projecting portions of the other levers.

3. In a friction ring clutch, the combination of drive ring, inside and outside jaws, spider, fulcrum levers mounted thereon and connected to the jaws and having inwardly-projecting portions, thrust collar, levers linked to the latter and having outwardly-projecting portions overlapping the inwardly-projecting portions of the fulcrum levers, swivel nuts in the latter, swivel thrust pieces in the outwardly-projecting portions of the other levers, and screws turning in the said nuts and shouldered to engage the said thrust pieces.

4. In a friction ring clutch, the combination of drive ring, inside and outside jaws, spider, fulcrum levers mounted thereon and connected to the jaws and having inwardly-projecting portions, thrust collar, levers linked to the latter and having outwardly-projecting portions overlapping the inwardly-projecting portions of the fulcrum levers, swivel nuts in the latter, swivel thrust pieces in the outwardly-projecting portions of the other levers, screws turning in the said nuts and shouldered to engage the said thrust pieces, and lock nuts turning on the screws and engaging the thrust pieces.

5. In a friction ring clutch, the combination of drive ring, inside and outside jaws, spider, fulcrum levers mounted thereon and connected to the jaws and having inwardly-projecting portions, thrust collar, levers linked to the latter and having outwardly-projecting portions overlapping the inwardly-projecting portions of the fulcrum levers, swivel nuts in the latter, and screws engaging said nuts to turn therein and having thrust engagement with the outwardly-projecting portions of the other levers through which said screws project to present on the outer sides of said levers portions to be taken hold of for manipulation in changing the adjustment.

6. In a friction ring clutch, the combination of drive ring, inside and outside jaws, spider, fulcrum levers mounted thereon and connected to the jaws and having inwardly-projecting portions, thrust collar, levers linked to the latter and having outwardly-projecting portions overlapping the inwardly-projecting portions of the fulcrum levers, swivel nuts in the latter, swivel thrust pieces in the outwardly-projecting portions of the other levers, and screws turning in the said nuts and shouldered to engage the said thrust pieces and projecting through the levers to present on the outer sides thereof portions to be taken hold of for manipulation in changing the adjustment.

7. In a friction ring clutch, the combination of drive ring, inside and outside jaws, spider, fulcrum levers mounted thereon and connected to the jaws and having inwardly-projecting portions, thrust collar, levers linked to the latter and having outwardly-projecting portions overlapping the inwardly-projecting portions of the fulcrum levers, swivel nuts in the latter, swivel thrust pieces in the outwardly-projecting portions of the other levers, screws turning in the said nuts and shouldered to engage the said thrust pieces and projecting through the levers to present on the outer sides thereof portions to be taken hold of for manipulation in changing the adjustment, and lock nuts turning on the screws on the outer sides of the levers and engaging the thrust pieces.

AUGUSTE L. MESSIER.

Witnesses:
 LOUIS B. ERWIN,
 ROBERT H. DOBBERMAN.